(12) United States Patent
Ovesen et al.

(10) Patent No.: US 12,478,954 B2
(45) Date of Patent: Nov. 25, 2025

(54) REFORMING CATALYST

(71) Applicant: TOPSOE A/S, Kgs. Lyngby (DK)

(72) Inventors: Charlotte Vinding Ovesen, Virum (DK); Christian Daugaard, Vedbæk (DK); Fernando Morales Cano, Virum (DK)

(73) Assignee: TOPSOE A/S, Kgs. Lyngby (DK)

( * ) Notice: Subject to any disclaimer, the term of this patent is extended or adjusted under 35 U.S.C. 154(b) by 654 days.

(21) Appl. No.: 17/780,130

(22) PCT Filed: Jan. 29, 2021

(86) PCT No.: PCT/EP2021/052146
§ 371 (c)(1),
(2) Date: May 26, 2022

(87) PCT Pub. No.: WO2021/152116
PCT Pub. Date: Aug. 5, 2021

(65) Prior Publication Data
US 2023/0020612 A1    Jan. 19, 2023

(30) Foreign Application Priority Data

Jan. 31, 2020    (DK) .......................... PA 2020 00126

(51) Int. Cl.
*B01J 23/04* (2006.01)
*B01J 23/755* (2006.01)
(Continued)

(52) U.S. Cl.
CPC ............. *B01J 23/04* (2013.01); *B01J 23/755* (2013.01); *B01J 37/0018* (2013.01);
(Continued)

(58) Field of Classification Search
CPC ...... B01J 23/04; B01J 23/755; B01J 37/0018; B01J 37/0036; B01J 37/0228;
(Continued)

(56) References Cited

U.S. PATENT DOCUMENTS 2,454,227 A    11/1948 Smith et al.
3,847,836 A    11/1974 Nicklin et al.
(Continued)

FOREIGN PATENT DOCUMENTS

CN    1950145 A    4/2007
CN    101347735 A    1/2009
(Continued)

OTHER PUBLICATIONS

First Technical Examination and Search Report mailed on Jul. 8, 2020 by the Danish Patent and Trademark Office in corresponding Danish Patent Application No. PA 2020 00126. (8 pages).
(Continued)

*Primary Examiner* — Daniel C. McCracken
*Assistant Examiner* — Starfari Teshawn McClain
(74) *Attorney, Agent, or Firm* — Boone IP Law (57) ABSTRACT

A novel steam reforming catalyst comprising hibonite and potassium beta-alumina with improved resilience, improved activity, reduced potassium leaching and reduced coking problems. It also regards a method for producing the novel catalyst and uses of the novel catalyst in reforming reactors, in a plant for producing hydrogen gas, or in a plant for producing synthesis gas.

21 Claims, 6 Drawing Sheets

(51) Int. Cl.
*B01J 37/00* (2006.01)
*B01J 37/02* (2006.01)
*B01J 37/08* (2006.01)
*C01B 3/40* (2006.01)

(52) U.S. Cl.
CPC ....... *B01J 37/0036* (2013.01); *B01J 37/0228* (2013.01); *B01J 37/088* (2013.01); *C01B 3/40* (2013.01); *B01J 2235/00* (2024.01); *B01J 2235/15* (2024.01); *C01B 2203/0233* (2013.01); *C01B 2203/1076* (2013.01); *C01B 2203/1094* (2013.01); *C01B 2203/1258* (2013.01)

(58) Field of Classification Search
CPC ...... B01J 37/088; B01J 21/04; B01J 2235/00; B01J 2235/15; B01J 23/78; B01J 23/002; B01J 2523/00; B01J 37/0207; C01B 3/40; C01B 2203/0233; C01B 2203/1076; C01B 2203/1094; C01B 2203/1258; C01B 2203/1058; C01B 2203/1082; Y02P 20/52
See application file for complete search history.

(56) References Cited

U.S. PATENT DOCUMENTS

| | | | |
|---|---|---|---|
| 4,579,729 A | 4/1986 | Schoenthal et al. | |
| 4,906,603 A | 3/1990 | Burgfels et al. | |
| 9,789,470 B2 | 10/2017 | Jacobsen et al. | |
| 10,780,425 B2 | 9/2020 | Jacobsen et al. | |
| 2004/0180786 A1 | 9/2004 | Zhao et al. | |
| 2005/0250863 A1 | 11/2005 | Green et al. | |
| 2006/0008413 A1 | 1/2006 | Garg et al. | |
| 2006/0009352 A1 | 1/2006 | Zhao et al. | |
| 2007/0167323 A1 | 7/2007 | Kobayashi | |
| 2010/0167919 A1 | 7/2010 | Lee et al. | |
| 2012/0070367 A1 | 3/2012 | Bittencourt | |
| 2014/0134098 A1 | 5/2014 | Faria et al. | |
| 2015/0231608 A1 | 8/2015 | Jacobsen et al. | |
| 2016/0236183 A1 | 8/2016 | Fonseca et al. | |
| 2017/0341936 A1* | 11/2017 | Wasserscheid | C01B 3/48 |
| 2018/0345255 A1 | 12/2018 | Murota et al. | |

FOREIGN PATENT DOCUMENTS

| | | | | |
|---|---|---|---|---|
| CN | 104640625 A | 5/2015 | | |
| CN | 105813737 A | 7/2016 | | |
| CN | 110013840 A | 7/2019 | | |
| EP | 0279389 A1 | 8/1988 | | |
| EP | 0360445 A1 | 3/1990 | | |
| EP | 1616838 A2 | 1/2006 | | |
| EP | 1808226 A1 | 7/2007 | | |
| EP | 2208529 A2 | 7/2010 | | |
| EP | 2900368 B1 | 5/2020 | | |
| GB | 1003702 A | 9/1965 | | |
| GB | 1166491 A | 10/1969 | | |
| GB | 1509557 A | 5/1978 | | |
| WO | 2004011138 A1 | 2/2004 | | |
| WO | 2005092497 A1 | 10/2005 | | |
| WO | 2006016983 A2 | 2/2006 | | |
| WO | 2007/044009 A1 | 4/2007 | | |
| WO | 2012121761 A1 | 9/2012 | | |
| WO | WO-2014048740 A1 * | 4/2014 | ............. | B01J 21/04 |
| WO | 2014/114931 A1 | 7/2014 | | |
| WO | 2015155175 A1 | 10/2015 | | |
| WO | 2021/152116 A1 | 8/2021 | | |

OTHER PUBLICATIONS

International Search Report (PCT/ISA/210) and Written Opinion (PCT/ISA/237) mailed on May 14, 2021, by the European Patent Office as the International Searching Authority for International Application No. PCT/EP2021/052146. (13 pages).

Komatsu, S. et al., "Studies on the Catalytic Activity of Alkali Polyaluminate as a Catalyst and Support of Nickel Catalyst for Steam Reforming of Hydrocarbons", Bulletin of the Japan Petroleum Institute, Nov. 1974, pp. 99-105, vol. 16, No. 2. (7 pages).

Zefirov, M.S., "Active Aluminum Oxide", Chemical Encyclopedia, 1995, vol. 1, Moscow, RU. (4 pages).

U.S. Appl. No. 18/574,005, filed Dec. 22, 2023, Charlotte Vinding Ovesen.

Danish Search Report mailed on Jan. 21, 2022, by the Danish Patent and Trademark Office for Danish Application No. PA 2021 00778, 8 Pages.

International Preliminary Report on Patentability received for PCT Patent Application No. PCT/EP2021/052146, mailed on Aug. 11, 2022, 8 pages.

International Search Report and Written Opinion received for PCT Patent Application No. PCT/EP2022/068111, mailed on Nov. 2, 2022, 14 pages.

Office Action received for Chinese Patent Application No. 202180006780.9, mailed on Jul. 20, 2023, 11 pages (5 pages of English Translation and 6 pages of Original Document).

* cited by examiner

Fig. 1

|  | Feed A | Feed B | | | |
|---|---|---|---|---|---|
| Ex | $KNO_3$ | AlOOH | $Al(OH)_3$ | $CaCO_3$ | $TiO_2$ |
|  | g | G | g | g | g |
| I | 5.5 | 98.2 | 21.2 | 21.0 | 0.99 |
| II | 5.5 | 98.2 | 21.2 | 21.0 | 1.66 |
| III | 0 | 100.7 | 21.7 | 17.2 | 0 |
| IV | 4.2 | 100.7 | 21.7 | 17.2 | 0 |
| V | 5.5 | 100.7 | 21.7 | 17.2 | 0 |
| VI | 0 | 100.7 | 21.7 | 17.2 | 1.16 |
| VII | 4.2 | 100.7 | 21.7 | 17.2 | 1.16 |
| VIII | 5.5 | 100.7 | 21.7 | 17.2 | 1.16 |
| IX | 0 | 102.4 | 22.1 | 14.6 | 0 |
| X | 4.2 | 102.4 | 22.1 | 14.6 | 0 |
| XI | 5.5 | 102.4 | 22.1 | 14.6 | 0 |
| XII | 4.2 | 102.4 | 22.1 | 14.6 | 1.16 |
| XIII | 5.5 | 102.4 | 22.1 | 14.6 | 1.16 |
| XIV | 4.2 | 103.6 | 22.3 | 12.6 | 1.16 |
| XV | 5.5 | 103.6 | 22.3 | 12.6 | 1.16 |
| XVI | 4.2 | 104.6 | 22.5 | 11.2 | 1.16 |
| XVII | 5.5 | 104.6 | 22.5 | 11.2 | 1.16 |
| XVIII | 4.2 | 105.3 | 22.7 | 10.0 | 1.16 |
| XIX | 5.5 | 105.3 | 22.7 | 10.0 | 1.16 |
| XX | 5.3 | 98.2 | 21.2 | 21.0 | 0 |
| XXI | 5.3 | 102.4 | 22.1 | 14.6 | 0 |
| XXII | 5.3 | 98.2 | 21.2 | 21.0 | 1.65 |
| XXIII | 3.9 | 102.4 | 22.1 | 14.6 | 1.16 |
| XXIV | 5.3 | 102.4 | 22.1 | 14.6 | 1.16 |
| XXV | 5.3 | 102.4 | 22.1 | 14.6 | 1.66 |
| XXVI | 5.5 | 104.6 | 22.5 | 11.2 | 1.16 |
| XXVII | 4.2 | 103.6 | 22.3 | 12.6 | 1.16 |
| XXVIII | 4.2 | 105.3 | 22.7 | 10.0 | 1.16 |
| XXIX | 5.5 | 105.3 | 22.7 | 10.0 | 1.16 |

Fig. 2

| Ex | Al/Ca | Ca | | Al | | O | | Ti | | K | | α-Al2O3 | Hibonit | Grossit | K-β-alumina | BET | PV |
|---|---|---|---|---|---|---|---|---|---|---|---|---|---|---|---|---|---|
| | mol/mol | mol% | wt% | mol% | wt% | mol% | wt% | mol% | wt% | mol% | wt% | wt% | wt% | wt% | wt% | m²/g | ml/kg |
| I | 7.9 | 4.1 | 7.9 | 32.1 | 41.7 | 62.8 | 48.4 | 0.17 | 0.4 | 0.85 | 1.6 | 0 | 37.3 | 38.9 | 23.8 | 2.2 | 317 |
| II | 8 | 3.9 | 7.6 | 31.5 | 40.9 | 63.0 | 48.5 | 0.43 | 1 | 1.06 | 2 | 0 | 41.1 | 35.9 | 23 | 2.3 | 339 |
| III | 9.5 | 3.9 | 7.4 | 37.0 | 47.5 | 59.2 | 45.1 | 0.00 | 0 | 0.00 | 0 | 25.9 | 44.4 | 29.6 | 0 | 2.8 | 336 |
| IV | 9 | 4.0 | 7.6 | 36.2 | 46.1 | 58.8 | 44.4 | 0.00 | 0 | 1.03 | 1.9 | 14.7 | 26.5 | 36.7 | 22.1 | 3.3 | 332 |
| V | 10.1 | 3.6 | 6.8 | 36.4 | 46.4 | 58.8 | 44.5 | 0.00 | 0 | 1.24 | 2.3 | 12.9 | 23.9 | 34.5 | 28.7 | 3.7 | 411 |
| VI | 9.7 | 3.8 | 7.3 | 37.2 | 47.5 | 58.7 | 44.5 | 0.31 | 0.7 | 0.00 | 0 | 9.7 | 74.2 | 16.2 | 0 | 3.1 | 353 |
| VII | 9.8 | 3.8 | 7.1 | 36.7 | 46.6 | 58.3 | 43.9 | 0.31 | 0.7 | 0.92 | 1.7 | 0 | 60 | 21 | 19 | 2.9 | 409 |
| VIII | 9.5 | 3.9 | 7.3 | 36.5 | 46.2 | 58.2 | 43.7 | 0.31 | 0.7 | 1.14 | 2.1 | 0 | 56.3 | 20.6 | 23.2 | 2.6 | 375 |
| IX | 11.9 | 3.2 | 6.1 | 37.4 | 48.4 | 59.4 | 45.5 | 0.00 | 0 | 0.00 | 0 | 30.5 | 49.7 | 19.8 | 0 | 3.7 | 342 |
| X | 11.6 | 3.2 | 6.1 | 37.0 | 47.5 | 59.1 | 45.0 | 0.00 | 0 | 0.75 | 1.4 | 34.6 | 16.6 | 31.8 | 17 | 3.4 | 339 |
| XI | 11 | 3.3 | 6.3 | 36.6 | 46.8 | 58.8 | 44.6 | 0.00 | 0 | 1.24 | 2.3 | 17 | 22.5 | 31.6 | 29 | 3.6 | 362 |
| XII | 11.5 | 3.2 | 6.1 | 37.1 | 47.3 | 58.5 | 44.2 | 0.31 | 0.7 | 0.92 | 1.7 | 0 | 72.9 | 10.2 | 16.9 | 2.8 | 394 |
| XIII | 11.7 | 3.2 | 6 | 37.1 | 47.2 | 58.3 | 44.0 | 0.31 | 0.7 | 1.14 | 2.1 | 0 | 58.5 | 17.1 | 24.3 | 3.1 | 441 |
| XIV | 14 | 2.7 | 5.1 | 37.5 | 48.1 | 58.7 | 44.6 | 0.26 | 0.6 | 0.86 | 1.6 | 0 | 73 | 9 | 16.9 | 2.9 | 453 |
| XV | 13.3 | 2.8 | 5.3 | 37.3 | 47.6 | 58.5 | 44.3 | 0.31 | 0.7 | 1.14 | 2.1 | 0 | 64.8 | 11.2 | 22.6 | 3 | 428 |
| XVI | 17.7 | 2.1 | 4.1 | 37.9 | 48.8 | 58.7 | 44.8 | 0.31 | 0.7 | 0.86 | 1.6 | 14.1 | 67 | 0 | 17.9 | 4.4 | 444 |
| XVII | 15.8 | 2.4 | 4.5 | 37.6 | 48.2 | 58.7 | 44.6 | 0.31 | 0.7 | 1.08 | 2 | 1.5 | 72.9 | 0 | 24.2 | 6.9 | 410 |
| XVIII | 17.5 | 2.1 | 4.1 | 37.9 | 48.8 | 58.8 | 44.9 | 0.31 | 0.7 | 0.80 | 1.5 | 13.6 | 68.2 | 0 | 17 | 3.4 | 413 |
| XIX | 17.8 | 2.1 | 4 | 37.8 | 48.6 | 58.7 | 44.7 | 0.31 | 0.7 | 1.08 | 2 | 7 | 67.9 | 0 | 23.7 | 4.2 | 422 |

Fig. 3

| Ex | Al/Ca | | Ca | | Al | | Ti | | K | | O | | α-Al2O3 | Hibonit | Grossit | K-β-alumina |
|---|---|---|---|---|---|---|---|---|---|---|---|---|---|---|---|---|
| | wt/wt | mol/mol | wt% | mol% | wt% | mol% | wt% | mol% | wt% | mol% | wt% | mol% | wt% | wt% | wt% | wt% |
| XX | 5.2 | 7.7 | 8.7 | 4.6 | 45.1 | 35.5 | 0 | 0.0 | 2.0 | 1.1 | 44.2 | 58.8 | 10.6 | 13.4 | 50.2 | 25.7 |
| XXI | 7.7 | 11.5 | 6.1 | 3.2 | 47.1 | 36.8 | 0 | 0.0 | 2.1 | 1.1 | 44.7 | 58.9 | 27.5 | 15.7 | 31.7 | 25.1 |
| XXII | 5.4 | 8.0 | 8.4 | 4.5 | 45 | 35.5 | 0.7 | 0.3 | 1.8 | 1.0 | 44.1 | 58.8 | 0 | 41.1 | 35.9 | 23 |
| XXIII | 7.8 | 11.5 | 6.1 | 3.2 | 47.3 | 37.1 | 0.72 | 0.3 | 1.7 | 0.9 | 44.2 | 58.4 | 0 | 72.9 | 10.2 | 16.9 |
| XXIV | 7.3 | 10.8 | 6.5 | 3.5 | 47.2 | 37.2 | 0.74 | 0.3 | 2.1 | 1.1 | 43.5 | 57.9 | 0 | 58.5 | 17.1 | 24.3 |
| XXV | 7.9 | 11.8 | 5.9 | 3.1 | 46.8 | 36.6 | 0.65 | 0.3 | 1.9 | 1.0 | 44.8 | 59.0 | 0 | 66.6 | 11.8 | 21.7 |
| XXVI | 9.4 | 14.1 | 5.1 | 2.7 | 48.1 | 37.5 | 0.6 | 0.3 | 1.6 | 0.9 | 44.6 | 58.7 | 0 | 73 | 9 | 16.9 |
| XXVII | 10.7 | 16.1 | 4.5 | 2.4 | 48.2 | 37.6 | 0.7 | 0.3 | 2 | 1.1 | 44.6 | 58.7 | 1.5 | 72.9 | 0 | 24.2 |
| XXVIII | 11.9 | 17.5 | 4.1 | 2.1 | 48.8 | 37.9 | 0.7 | 0.3 | 1.5 | 0.8 | 44.9 | 58.8 | 13.6 | 68.2 | 0 | 17 |
| XXIX | 12.2 | 17.6 | 4 | 2.1 | 48.6 | 37.8 | 0.7 | 0.3 | 2 | 1.1 | 44.7 | 58.7 | 7 | 67.9 | 0 | 23.7 |

Fig. 4

| Ex | Al/Ca | | Ca | | Al | | Ti | | K | | O | | Ni | |
|---|---|---|---|---|---|---|---|---|---|---|---|---|---|---|
| | wt/wt | mol/mol | wt% | mol% | wt% | mol% | wt% | mol% | wt% | mol% | wt% | mol% | wt% | mol% |
| XX | 5.2 | 7.7 | 7.1 | 4.1 | 37.0 | 31.6 | 0.0 | 0.0 | 1.6 | 1.0 | 40.1 | 57.8 | 14.1 | 5.5 |
| XXI | 7.7 | 11.5 | 5.0 | 2.9 | 39.0 | 32.9 | 0.0 | 0.0 | 1.7 | 1.0 | 40.7 | 57.9 | 13.6 | 5.3 |
| XXII | 5.4 | 8.0 | 6.8 | 3.9 | 36.5 | 31.4 | 0.6 | 0.3 | 1.4 | 0.8 | 39.9 | 57.7 | 14.8 | 5.8 |
| XXIII | 7.8 | 11.5 | 5.0 | 2.9 | 38.9 | 33.0 | 0.6 | 0.3 | 1.4 | 0.8 | 40.1 | 57.5 | 14.0 | 5.5 |
| XXIV | 7.3 | 10.8 | 5.3 | 3.1 | 38.7 | 33.1 | 0.6 | 0.3 | 1.7 | 1.0 | 39.5 | 57.0 | 14.2 | 5.6 |
| XXV | 8.0 | 11.8 | 4.7 | 2.7 | 37.6 | 32.1 | 0.5 | 0.3 | 1.5 | 0.9 | 40.2 | 57.9 | 15.5 | 6.1 |
| XXVI | 9.4 | 14.1 | 4.2 | 2.4 | 39.8 | 33.6 | 0.5 | 0.2 | 1.3 | 0.8 | 40.6 | 57.8 | 13.6 | 5.3 |
| XXVII | 10.7 | 16.1 | 3.7 | 2.1 | 39.2 | 33.3 | 0.6 | 0.3 | 1.6 | 1.0 | 40.3 | 57.7 | 14.6 | 5.7 |
| XXVIII | 11.9 | 17.5 | 3.3 | 1.9 | 39.9 | 33.7 | 0.6 | 0.3 | 1.2 | 0.7 | 40.6 | 57.8 | 14.4 | 5.6 |
| XXIX | 12.2 | 17.6 | 3.3 | 1.9 | 40.7 | 34.1 | 0.6 | 0.3 | 1.7 | 1.0 | 40.9 | 57.8 | 12.9 | 5.0 |

Fig. 5

| Ex | Al/Ca | | Ca | | Al | | Ti | | K | | O | | Ni | | α-Al2O3 | Hibonit | Grossit | K-β-alumina | Ni+NiO |
|---|---|---|---|---|---|---|---|---|---|---|---|---|---|---|---|---|---|---|---|
| | wt/wt | mol/mol | wt% | mol% | wt% | mol% | wt% | mol% | wt% | mol% | wt% | mol% | wt% | mol% | wt% | wt% | wt% | wt% | wt% |
| XX | 5.2 | 7.7 | 7.4 | 4.6 | 38.5 | 35.6 | 0.0 | 0.0 | 1.6 | 1.0 | 37.7 | 58.8 | 14.7 | 6.2 | 5.9 | 14.1 | 35.3 | 32.3 | 12.4 |
| XXI | 7.7 | 11.5 | 5.2 | 3.2 | 40.5 | 36.8 | 0.0 | 0.0 | 1.8 | 1.1 | 38.4 | 58.9 | 14.1 | 5.9 | 19.6 | 13.6 | 16.5 | 31.7 | 17.8 |
| XXII | 5.4 | 8.0 | 7.1 | 4.5 | 38.1 | 35.5 | 0.6 | 0.3 | 1.6 | 1.0 | 37.3 | 58.7 | 15.4 | 6.6 | 0 | 38.4 | 23.4 | 24.4 | 13.8 |
| XXIII | 7.8 | 11.5 | 5.2 | 3.2 | 40.4 | 37.2 | 0.6 | 0.3 | 1.3 | 0.8 | 37.7 | 58.5 | 14.6 | 6.2 | 0 | 65.8 | 1.7 | 19.2 | 13.3 |
| XXIV | 7.3 | 10.8 | 5.5 | 3.5 | 40.3 | 37.2 | 0.6 | 0.3 | 1.7 | 1.1 | 37.1 | 57.9 | 14.7 | 6.3 | 0 | 54 | 5.5 | 25.3 | 14.3 |
| XXV | 8.0 | 11.8 | 4.9 | 3.1 | 39.2 | 36.6 | 0.5 | 0.3 | 1.7 | 1.1 | 37.5 | 59.0 | 16.2 | 6.9 | 0 | 58.5 | 4.2 | 23.1 | 14.3 |
| XXVI | 9.4 | 14.1 | 4.4 | 2.5 | 41.3 | 35.4 | 0.5 | 0.2 | 1.3 | 0.8 | 38.3 | 55.4 | 14.1 | 5.6 | 0 | 62.6 | 1.7 | 20.1 | 15.7 |
| XXVII | 10.7 | 16.1 | 3.8 | 2.2 | 40.9 | 35.3 | 0.6 | 0.3 | 1.6 | 1.0 | 37.8 | 55.1 | 15.2 | 6.1 | 1.7 | 58.3 | 0 | 22.8 | 17.1 |
| XXVIII | 11.9 | 17.5 | 3.5 | 2.0 | 41.5 | 35.7 | 0.6 | 0.3 | 1.2 | 0.7 | 38.2 | 55.4 | 15.0 | 5.9 | 11.9 | 55.1 | 0 | 16.6 | 16.4 |
| XXIX | 12.2 | 17.6 | 3.5 | 2.0 | 42.1 | 35.9 | 0.6 | 0.3 | 1.6 | 0.9 | 38.7 | 55.7 | 13.3 | 5.2 | 6.8 | 56 | 0 | 22.2 | 14.9 |

Fig. 6

REFORMING CATALYST

FIELD OF THE INVENTION

The present invention regards a novel steam reforming catalyst with improved resilience, improved activity, reduced potassium leaching and reduced coking problems. It also regards a method for producing the novel catalyst and uses of the novel catalyst in reforming reactors, in a plant for producing hydrogen gas, or in a plant for producing synthesis gas.

BACKGROUND

Steam reforming of natural gas or naphtha is an important route to production of hydrogen and synthesis gas. The environment of the catalyst is quite harsh. Steam is reacted with the hydrocarbon at high temperatures (350-1100° C.) in the presence of a metal-based catalyst to form mainly carbon monoxide and hydrogen. The most frequently used metal is nickel, but also other metals such as Ru, Rh, Ir, Pt and Pd catalyzes the steam reforming reaction. The metal is commonly supported on an alumina support or a promoted alumina support.

Accordingly, steam reforming catalysts have a range of challenges for industrial application in such processes. For example, it is important that
 the activity of the catalyst is retained for a long period of time,
 the carbon formation on the catalyst is minimized in order to retain activity,
 the catalyst body is mechanically stable at high temperatures and has a high pore volume.

A high activity of the catalyst throughout the catalyst lifetime is essential for optimal performance, as the higher activity will convert the higher hydrocarbons at a relatively lower temperature where the potential for carbon formation is lower.

A well-known problem for steam reforming catalysts is the formation of carbon from higher hydrocarbons on e.g. a Ni-based catalyst (also termed coking). The formation of carbon is detrimental to the catalyst as pyrolytic carbon will deposit on the reactor wall and catalyst body and decrease heat transfer into the catalyst bed. Another problem is that formation of whisker carbon eventually fills the catalyst pores and may cause breaking of catalyst bodies in addition to reduced activity. Alkali metals are known to promote gasification of carbon thereby preventing or reducing formation of pyrolytic carbon. Alkali metals are also known to prevent whisker carbon formation on a Ni-catalyst through adsorption of the alkali metal on the Ni-particle thereby inhibiting carbon formation on the active site of the catalyst. Alkali metals, however, also have a negative effect, since it tends to lower the steam reforming activity and to migrate from the catalyst under the steam reforming reaction conditions as alkali metal reacts with water forming a volatile alkali-hydroxide. This leads to loss of the useful properties of alkali metals and laydown of alkali metal in the downstream processes.

In US2018345255 a steam reforming catalyst is disclosed, which comprises a carrier and a catalyst supported thereon. The carrier contains a composite oxide containing Ce and Zr. Ni and Ti are supported on the carrier. The steam reforming catalyst obtained can prevent the catalytic activity reduction by sulfur poisoning and can maintain a high conversion of the hydrocarbon to hydrogen, without using expensive noble metals.

WO 14/048740 discloses a method for preparation of a supported nickel catalyst for steam reforming of e.g. natural gas or naptha, in which an aqueous mixture comprising an alkali metal salt plus other metal salts is first calcined then sintered to form a support material thus creating an alkali reservoir in the form of alkali beta-alumina phases within the support. The formed reservoir slowly releases the potassium to the surface where active Ni-particles are supported on the carrier material thus preventing carbon formation. Capture of the alkali metal within the support, restricts migration of the alkali and assures a slow release of potassium to the catalyst surface. The resulting catalyst has an excellent activity and sufficient carbon resistance over the catalyst lifetime and at the same time restricts potassium migration to the downstream process. The finished support material is mentioned to comprise 8 wt % or more potassium beta-alumina, 30-90 wt % magnesium alumina spinel, 0-60 wt % grossite and/or hibonite; and 0-5 wt % alpha-alumina. However, the document does not give any importance, relevance or significance to the nature of the calcium aluminate phases. In fact, the examples only contain minor amounts of hibonite (at least below 5 wt % of the support) and a large amount of grossite (at least above 10 wt % of the support). In particular, all of the examples contain much more grossite than hibonite.

WO 2005/092497 discloses a calcium-promoted alumina supported nickel reforming catalyst stabilized with titanium useful for reforming reactions in feed streams containing significant quantities of CO and $CO_2$, low quantities of steam and relatively high quantities of sulfur compounds. The catalyst may be impregnated with potassium to reduce carbon formation. The catalyst can be used in reforming reactions to produce syngas and has advantages in producing low hydrogen to carbon monoxide ratio syngas for applications such as iron ore reduction.

There is a continued need for catalysts and catalyst supports having increased lifetime in a steam reforming environment (end of run activity) and providing enhanced steam reforming activity, excellent carbon resistance as well as good catalyst body resilience.

SUMMARY OF THE INVENTION

The inventors of the present patent application set out to improve the catalysts of WO 14/048740 comprising an alkali reservoir in the form of alkali beta-alumina phases formed within the support.

These catalysts belong to the group of transition metals on an alkali promoted ceramic support comprising alkali beta-alumina phases. Generally the crystal structures and thus the physical and chemical characteristics of such catalysts are not predictable and may, e.g., vary with the relative amounts of each metal and with the raw materials used. In addition, the crystal structures formed may depend on the process of producing the catalysts. In other words, the Gibbs free energy of formation for various crystal structures vary quite a lot. Therefore it has previously only been considered realistic to optimize on a single structure when optimizing the composition of a catalyst.

The inventors surprisingly found that, even though the Gibbs free energies required for forming hibonite and potassium beta-alumina phases, respectively, are very different, that for certain molar ratios of aluminium to calcium and in the presence of potassium and titanium, it was possible to obtain a catalyst support rich in hibonite phase while still maintaining a high level of the alkali beta-alumina phase.

According to an aspect of the present invention a catalyst support is provided for use in steam reforming, the support comprising at least 35 wt % hibonite and 10-35 wt % potassium-beta-alumina upon calcination.

The inventors found that catalysts based on such catalyst supports exhibited superior potassium stability, prolonged steam reforming activity, excellent carbon resistance, and superior mechanical resistance compared to catalysts of the prior art.

In addition, the inventors surprisingly found that catalysts based on the catalyst supports according to the invention had further advantages since they showed significantly improved reduction properties in a reducing atmosphere.

Preferably, the catalyst support comprises less than a total of 30 wt % of the alumina crystal structures grossite ($CaAl_4O_7$) and/or alpha-alumina ($\alpha$-$Al_2O_3$) upon sintering. The inventors have found that both alpha alumina and grossite facilitate carbon formation through decomposition, cracking and polymerization reactions. It is typically observed in naptha reforming but can also be observed in reforming of heavy natural gas depending on the feed composition. $\alpha$-$Al_2O_3$ (alpha alumina) in the catalyst support is known to introduce acidity. The inventors surprisingly found, that very much hibonite and potassium beta-alumina and very little grossite and alpha-alumina was formed for molar ratios of Al:Ca above 8 and below 20. They also found that $\alpha$-$Al_2O_3$ was absent from the catalyst support for molar ratios of Al:Ca above 8 and below 14. When the Al:Ca ratio was above 14 but below 20, a little $\alpha$-$Al_2O_3$ was formed. However this had little effect on the catalyst.

According to another aspect of the present invention, a steam reforming catalyst is provided comprising 75-90 wt % of the catalyst support according to the present invention, and 10-25 wt % nickel oxide on the basis of the calcined catalyst.

Such a catalyst, which is rich in hibonite and potassium-beta-alumina phases, provides a steam reforming catalyst which has an enhanced EOR (end of run), enhanced steam reforming activity and an excellent carbon resistance as well as good catalyst body resilience. In addition such catalysts showed significantly improved reduction properties in a reducing atmosphere. All these advantages contribute to improving the lifetime of the steam reforming catalyst in the plant. Thus, a superior catalyst is achieved improving plant performance.

The catalyst may e.g. be used in a primary or tubular steam reformer. Advantageously, the titanium promoted the formation of the hibonite phase with only a minor decrease in potassium-beta-alumina phase. The catalyst may be used in steam reforming of heavy natural gas and can operate substantially without formation of carbon.

The process of producing the catalyst supports according to the invention, is important for obtaining the desired amounts of the hibonite and the potassium beta-alumina phases.

According to another aspect of the present invention a process is provided for producing a catalyst support suitable for steam reforming, the process comprising:

i. Providing an extrudable catalyst support paste comprising
   aluminium in the range of from 85 to 94 mol % per total metal present in the paste,
   calcium in the range of from 4.7 to 12 mol % Ca per total metal present in the paste,
   titanium in the range of from 0.1 to 2.7 mol % Ti per total metal present in the paste, and
   potassium in the range of from 0.5 to 5 mol % K per total metal present in the paste, and
   a paste solvent; and
      wherein the molar ratio of aluminium:calcium is from 8 to 20, such as from 8 to 16 or 8 to 14;
ii. shaping the paste into catalyst support bodies
iii. sintering the catalyst support bodies at a temperature in the range of from 1100-1500° C. to form a sintered catalyst support comprising at least 35 wt % hibonite and 10-35 wt % potassium-beta-alumina.

An advantage of the process according to the present invention is that catalyst supports are provided which exhibit the desired amounts of the hibonite and the potassium beta-alumina phases and thus provides advantages as mentioned in the following. The catalyst supports obtainable by the process according to the invention are useful for providing steam reforming catalysts which have an enhanced EOR (end of run) steam reforming activity, enhanced steam reforming activity and an excellent carbon resistance as well as good catalyst body resilience. All in all this improves the lifetime of the steam reforming catalyst in the plant. Thus, a superior catalyst is achieved improving plant performance.

In the process according to the invention it is important that both aluminium, calcium, titanium and potassium are mixed prior to the sintering of the catalyst support bodies. This allows for the formation of abundant amounts of hibonite and potassium-beta-alumina phases which provide the advantages of the invention

DETAILED DESCRIPTION OF THE INVENTION

Definitions

In the present context the term "calcining" is meant to refer to a thermal treatment of a metal containing body where volatile compounds, such as solvents or impurities are removed and simple metal oxides are formed through thermal decomposition of the metal compounds. The general calcining temperature range is 250-800° C. In the present invention the catalyst support bodies are preferably calcined at a support calcining temperature of 300-600° C. to remove the solvent and to form metal oxides. In the present invention the catalyst precursor is preferably calcined at a catalyst calcining temperature of 350-550° C. to remove the solvent and to form nickel oxide. For certain uses it is preferred that no phase transformation takes place. In such cases it is preferred to perform the calcination at temperatures below about 600° C.

In the present context "sintering" is meant to refer to a thermal treatment of a metal containing body facilitating a phase transformation or a structural rearrangement of the metal atoms. The general sintering temperature range is 900-1800° C. In the present invention a paste comprising various metals are sintered at a sintering temperature in the range of from 1100-1500° C. to generate a sintered catalyst support comprising calcium aluminate phases (in particular hibonite) and potassium-beta-alumina phases.

The term "sintered catalyst support" is meant to refer to the material obtained after sintering the catalyst support paste. The sintered catalyst support may also be referred to simply as the "catalyst support".

The term "calcined catalyst support" is meant to refer to the material obtained after calcining at a catalyst support calcining temperature.

In the present context, catalyst support bodies may also be referred to as catalyst support precursors.

The "catalyst precursor" is meant to refer to the catalyst support impregnated with a solution of the active metal, but prior to forming the metal oxide (by decomposition or catalyst calcination). The catalyst precursor is a stable intermediate in the production of a supported nickel catalyst.

The term "decomposed catalyst" is meant to refer to the catalyst precursor after it has been exposed to decomposition at a catalyst calcining temperature. It may also be referred to as the calcined catalyst or the calcined steam reforming catalyst.

The term "activated catalyst" is meant to refer to the catalyst after the active metal has been reduced (i.e. after NiO has been reduced to Ni). It may also be referred to as "reduced catalyst". It may be obtained e.g. by exposing the decomposed catalyst to a reducing atmosphere or by exposing the passivated catalyst to a reducing atmosphere.

The term "reduced, passivated catalyst" or "passivated catalyst" is meant to refer to the catalyst after it has been reduced and then removed (without being exposed to ageing) from the reducing atmosphere and then exposed to an oxidative atmosphere resulting in a surface oxidation of the active metal into NiO.

The term "aged catalyst" is meant to refer to the catalyst after exposure to an extended period of use in steam reforming or conditions resembling extended use in steam reforming. Typically, conditions resembling extended use accelerate the ageing process of the catalyst. After the ageing procedure, the aged catalyst is exposed to an oxidative atmosphere resulting in a surface oxidation of the active metal into NiO.

The term "catalyst" is meant to refer to a catalytically active material. The catalytically active material typically comprises a) an active constituent, in this case a catalytically active metal, which provides chemical interaction with the reactants, and b) a porous support which has the primary function of presenting in its surface the active constituent over a large area and typically in many individual clusters or pores. In addition, another component c) in the form of a structural support may be present with the main function of providing a defined structure with mechanical/physical stability to the catalytically active material. Furthermore, additional constituents d) such as stabilizers reducing the sintering or similar deactivation of crystal structures and/or particles of active constituents and e) further active constituents may be present in the catalytically active material. The catalytically active material may also be referred to as the reduced catalyst or the reduced catalytically active material.

In the present context when a material, such as a metal, is considered "catalytically active" it is capable of increasing the reaction rate of the reaction which it catalyzes by at least one order of magnitude, preferably two orders of magnitude, and even more preferably five orders of magnitude when compared to the reaction rate of the same reaction under same reaction conditions except in the absence of the catalytically active material. The steam reforming catalysts according to the present invention catalyze steam reforming reactions including steam reforming of methane ($CH_4 + H_2O = CO + 3H_2$), steam reforming of higher hydrocarbons ($C_nH_m + nH_2O = nCO + (n+0.5\ m)H_2$), and the water gas shift reaction ($CO + H_2O = CO_2 + H$). In the absence of a material catalyzing the steam reforming reactions, it is barely possible to measure any reactivity.

The Catalyst Support

According to the invention a catalyst support for use in steam reforming is provided, which comprises at least 35 wt % hibonite and 10-35 wt % potassium beta-alumina upon sintering. The inventors surprisingly found, that very much hibonite and potassium beta-alumina and very little grossite and alpha-alumina was formed for molar ratios of Al:Ca above 8 and below 20. In an embodiment, the catalyst support comprises at least 50 wt % hibonite and 15-35 wt % K-beta-alumina. In another embodiment, the catalyst support comprises at least 60 wt % hibonite and 20-30 wt % K-beta-alumina. There is no upper limit for the amount of hibonite, except for a practical maximum of the total amount of support not exceeding 100%. Accordingly, the practical maximum for hibonite is respectively 90, 85, and 80 wt %.

It was surprisingly found that promoting with Ti resulted in slightly lower concentration of the beta-alumina phase and significantly higher hibonite concentration. The higher concentration of hibonite had a positive effect on the long term catalyst activity and the carbon resistance which was improved even though the amount of potassium-beta-alumina phase was lower. The Ti-promoted catalysts also had a lower potassium loss demonstrating a more stable potassium beta-alumina phase had been formed.

In the present context, hibonite is meant to refer to a composition of the formula $CaAl_{12}O_{19}$. The inventors have found that hibonite is a desired component in the catalyst as it is thermostable and stabilizes the Ni-particles inhibiting sintering resulting in long stability and high end of run activity. This again has a positive effect on the carbon resistance as small Ni-particles has a higher resistance against carbon formation than large Ni-particles. The inventors found that when high activities of the catalysts are obtained then conversion of the hydrocarbon may take place at a lower temperature again lowering the risk of carbon formation.

The K-β-alumina phase serves as a K-reservoir further increasing the carbon resistance of the catalyst. Potassium is known to promote gasification of carbon thereby increasing resistance towards carbon formation. Potassium also adsorbs on active sites on the Ni-particles thereby inducing resistance towards carbon formation. However, potassium is also known to decrease the activity of the catalyst and therefore, a low concentration in the vicinity of the active nickel is desirable. The potassium will with time migrate from the catalyst as it reacts with water in the gas stream creating potassium hydroxide that is volatile. K-β-alumina provides a K-reservoir that slowly liberates potassium to the surface thereby maintaining a sufficient concentration of potassium on the Ni-particles to provide resistance towards carbon formation yet low enough to retain a high steam reforming activity. The low concentration of potassium results in maximum possible activity.

In summary the hibonite phase provides long term stability of the catalyst with respect to activity and the K-β-alumina phase provides long term stability with respect to carbon resistance.

In an embodiment according to the invention, the total amount of hibonite and potassium beta-alumina in the catalyst support is at least 60 wt %, such as at least 70, 80, 90, or 100 wt % upon sintering. Such a support mainly consists of advantageous phases and contains only minor amounts of other possibly disadvantageous phases.

In an embodiment according to the present invention, the catalyst support comprises less than a total of 40 wt % of the alumina crystal structures grossite and/or alpha-alumina upon sintering, such as less than 30, 25, 20, 15, 10, 5 or 0 wt %.

The crystal structure alpha-alumina ($\alpha$-$Al_2O_3$) is known to be acidic and cause acidity when present in the catalyst support. The inventors have found that also grossite ($CaAl_4O_7$) has an adverse effect on the catalyst properties and that both phases facilitate carbon formation through decomposition, cracking and polymerization reactions. It is typically observed in naptha reforming but can also be observed in reforming of heavy natural gas depending on the feed composition. As mentioned, $\alpha$-$Al_2O_3$ (alpha alumina) in the catalyst support is known to introduce acidity. The inventors surprisingly found, that $\alpha$-$Al_2O_3$ was absent from the catalyst support for molar ratios of Al:Ca above 8 and below 14. When the Al:Ca ratio was above 14 but below 20, a little $\alpha$-$Al_2O_3$ was found. However, these minor amounts had little effect on the catalyst. According to an embodiment of the present invention the molar ratio of Al to Ca in the catalyst support is in the range of from 8 to 20, such as from 8 to 16 or from 8 to 14.

Accordingly, in an embodiment of the present invention, the catalyst support comprises from 40-90 wt % hibonite, from 0-30 wt % grossite or alpha-alumina and from 10-30 wt % potassium beta-alumina. In another embodiment the catalyst support comprises from 50-70 wt % hibonite, from 0-5 wt % grossite or alpha-alumina and from 20-30 wt % potassium beta-alumina.

It was found that catalyst supports according to the invention, which were rich in hibonite and potassium beta-alumina, could advantageously be obtained at least when the molar ratio of Ca:Al:Ti:K was in the range of 1:(8-20):(0.01-0.5):(0.05-1.0), such as 1:(10-16):(0.1-0.3):(0.3-0.6). In addition to a Al:Ca molar ratio of 8 to 20, this would imply a Ti:Ca molar ratio of 0.01 to 0.5 and a K:Ca molar ratio of 0.05 to 1 and a K:Ti molar ratio of 0.1 to 100.

Preferred ranges for Al:Ca are 8 to 16, more preferred 8 to 14. Preferred ranges for Ti:Ca are 0.05 to 0.3, more preferred 0.08 to 0.3. Preferred ranges for K:Ca are 0.1 to 0.8, more preferred 0.3 to 0.6. Preferred ranges for K:Ti are 0.5 to 20, more preferred 2 to 8. All ratios are molar ratios.

Preferably, the catalyst support consists upon calcination and/or sintering essentially of oxides of aluminium, calcium, titanium and potassium. In and embodiment, the catalyst support comprises oxides of aluminium, calcium, titanium and potassium, wherein the total weight of the oxides of aluminium, calcium, titanium and potassium account for minimum 99 wt %, such as 100 wt %, of the catalyst support on a dry matter basis.

The catalyst support according to the present invention is useful for producing a catalyst body which requires resistance to decomposition by heat, pressure, or chemical attack, and which should retain strength and form at high temperatures. In particular, the catalyst support is useful for producing a catalyst for steam reforming.

The Catalyst

According to an aspect of the present invention, a steam reforming catalyst is provided which comprises 75-90 wt % of the catalyst support as specified above, and 10-25 wt % nickel oxide on the basis of the calcined catalyst. In an embodiment of the present invention, the steam reforming catalyst comprises 80-85 wt % of the catalyst support as specified above, and 15-20 wt % nickel oxide on the basis of the calcined catalyst.

The catalyst tests surprisingly demonstrated that the hibonite rich steam reforming catalyst according to the invention had a lower potassium loss, lower activity loss leading to a higher EOR activity and higher carbon resistance demonstrated by the lower critical O/C ratio (See the examples). It was surprisingly found that promoting with Ti resulted in slightly lower concentration of the beta-alumina phase and significantly higher hibonite concentration. The higher concentration of hibonite had a positive effect on the long term catalyst activity and the carbon resistance which was improved even though the amount of potassium-beta-alumina phase was lower. The Ti-promoted catalysts also had a lower potassium loss demonstrating a more stable potassium beta-alumina phase had been formed.

According to an embodiment of the present invention, a steam reforming catalyst is provided comprising oxides of aluminium, calcium, titanium potassium and nickel, wherein the total weight of the oxides of aluminium, calcium, titanium potassium and nickel account for minimum 99 wt % of the calcined catalyst on a dry matter basis.

The inventors also found that the catalysts according to the present invention had improved reduction properties which is important for activating the catalyst prior to use.

Activation of the steam reforming catalyst is typically performed on site (i.e. in the steam reforming reactor). Typically, the calcined catalyst is placed in the steam reforming reactor, and NiO is reduced by hydrogen to Ni thus producing the catalytically active steam reforming catalyst (or the catalytically active material). Activation is conveniently performed in a process gas, typically having a steam carbon ratio of 6-10. Hydrogen is thus generated by steam reforming of the hydrocarbon starting in the bottom of the reactor where the temperature is higher (650-850° C.). By back diffusion of hydrogen the catalyst above is reduced and eventually the catalyst in the top of the reactor where the temperature is lower (450-500° C.) is reduced. The reduction properties of the catalyst is important for fast and easy reduction of the catalyst. In particular, full reduction of the catalyst in the top of the reactor where the temperature is lower may be more challenging. The composition of the support can affect the reduction properties, thus both CaO and MgO is known to retard the reduction of NiO. In addition, potassium can have the same effect.

The Process for Producing the Catalyst Support

In the process according to an aspect of the invention for producing the catalyst support according to the first aspect of the invention, the aluminium may come from any source of aluminium. Similarly the calcium may come from any source of calcium, the titanium come from any source of titanium and the potassium come from any source of potassium. The sources of the metals may e.g. be metal salts, metal minerals, metal oxides, or metal hydroxides.

The support paste may be produced in any suitable way providing aluminium, calcium, titanium and potassium in forms enabling them to undergo phase changes in the sintering process to form the hibonite and potassium beta-alumina phases. According to an embodiment of the present invention the support paste is provided by mixing particulate sources of aluminium, calcium titanium and potassium with the paste solvent; to obtain an extrudable catalyst support paste. In an embodiment, the particulate sources of aluminium, calcium titanium and potassium have grain diameter sizes of less than 5 mm, preferably less than 1 mm.

The source of calcium may, e.g., be selected from the group consisting of CaO, $CaCO_3$, $Ca(HCO_2)_2$, $Ca(OH)_2$ $Ca(NO_3)_2$, $CaO \cdot Al_2O_3$, $3CaO \cdot Al_2O_3$, $CaO \cdot 6Al_2O_3$ and $12CaO \cdot 7Al_2O_3$, or mixtures thereof The source of aluminium may, e.g., be selected from the group consisting of AlOOH, $Al(OH)_3$, $Al_2O_3$, $Al(NO_3)_3$, $CaO \cdot Al_2O_3$, $3CaO \cdot Al_2O_3$, $CaO \cdot 6Al_2O_3$ and $12CaO \cdot 7Al_2O_3$, or mixtures thereof.

The source of titanium may, e.g., be selected from the group consisting of Titanium oxide, titanium hydroxide, titanium nitrate, titanium chloride titanium metal and any organic form of titanium preferably titanium oxide and titanium hydroxide, such as $TiO_2$, $Ti(OH)_4$, $Ni(NO_3)_4$, $Ti(NO_3)_4$, $TiCl_4$, and Ti; or mixtures thereof.

The source of potassium may, e.g., be selected from the group consisting of potassium metal salt, such as a potassium salt of nitrate, hydroxide or carbonate; or combinations thereof.

According to an embodiment of the invention, the paste solvent is selected from the group consisting of water, and water comprising a mineral acid. Preferably, the solvent comprises the mineral acid $HNO_3$.

According to an embodiment of the present invention, the shaping into catalyst support bodies in step ii. comprises extruding the paste to produce an extrudate. Between step ii. of shaping and step iii. of sintering, the catalyst support bodies may be calcined at a support calcining temperature in the range of from 300-600° C. to produce a calcined catalyst support. Preferably, the support calcining temperature is selected within the range of from 400-550° C., such as in the range of from 450-500° C. The calcined catalyst support may be milled, mixed with a lubricant, and then shaped into tablets prior to being subjected to step iii. of sintering. The lubricant may be selected from the group consisting of magnesium stearate, aluminium stearate and calcium stearate or combinations thereof.

The catalyst support may comprise small amounts of titanium oxide. Preferably the catalyst support comprises less than 5 wt % of other metal oxides than the ones mentioned above prior to addition of the active metal, such as nickel.

The Process for Producing the Steam Reforming Catalyst

According to an aspect of the present invention the calcined steam reforming catalyst is prepared by:
a. Providing a sintered catalyst support according to the invention as described above;
b. Applying an aqueous solution of a nickel salt to the sintered catalyst support to provide a catalyst precursor; and
c. Calcining the catalyst precursor at a catalyst calcining temperature in the range of from 350 to 550° C., such as from 400 to 500° C., to decompose the nickel salt into nickel oxide to obtain the calcined catalyst thus ready for use.

In step b) the aqueous solution of the nickel salt could be applied to the support by impregnation, such as by incipient wetness.

Steps b) and c) could be repeated one or more times in order to increase the amount of nickel in the catalyst.

According to an embodiment of the present invention, the nickel salt is selected from the group consisting of nickel nitrate, nickel acetate, nickel citrate, nickel lactate, and nickel carbonate; or combinations thereof.

The catalyst according to the present invention is useful in a steam reforming process. Typically, the calcined catalyst is placed in a steam reforming reactor, where it is activated in a reducing atmosphere facilitating reduction of nickel oxide into nickel metal to produce the active catalyst catalyzing the steam reforming reactions. Generally, the steam reforming process is performed as a continuous process passing a hydrocarbon feed over said steam reforming catalyst in the presence of steam so as to produce synthesis gas. Once the activity has decrease to a level where the yields is no longer acceptable or where the level of carbonization is no longer acceptable, the catalyst load of the steam reforming reactor must be regenerated or replaced by fresh catalyst. This necessitates a down period for the process, which is time consuming and therefore implicates a significant loss of profit. Therefore, a catalyst with increased life time is highly advantageous. The new catalyst load must be reduced after replacement, and also this process is time consuming. Improved reduction properties will result in a shorter period of time for reducing the catalyst and a shorter period before and acceptable yield is achieved thus resulting in increased profitability.

The steam reforming process may be integrated into e.g. a plant for producing hydrogen or a plant for producing synthesis gas.

EXAMPLE

Examples I-XIX: Support Materials for Steam Reforming Catalysts

All the supports tested, were prepared according to the following procedure:
Feed A: KNO3 (for amounts, see FIG. 2)
Feed B: Dry mixture of $TiO_2$, AlOOH, $Al(OH)_3$, and $CaCO_3$ (for amounts, see FIG. 2).

Feed A ($KNO_3$) was added to a z-mixer containing 100 g of water and 5.2 g of $HNO_3$ (65 wt %) thermostated at 70° C. When feed A was dissolved, feed B (dry mixture of Ti $O_2$, AlOOH, $Al(OH)_3$, and $CaCO_3$) was added and the mixture was mixed to homogeneity. The paste was then fed into an extruder and extruded to extrudates. The extrudates were dried at 110° C. overnight and calcined at 450-500° C. around half an hour. The calcined extrudates were milled and mixed with magnesium stearate and tabletized. The tablets were sintered at 1200-1400° C. around 4 hours.

Figure 2:
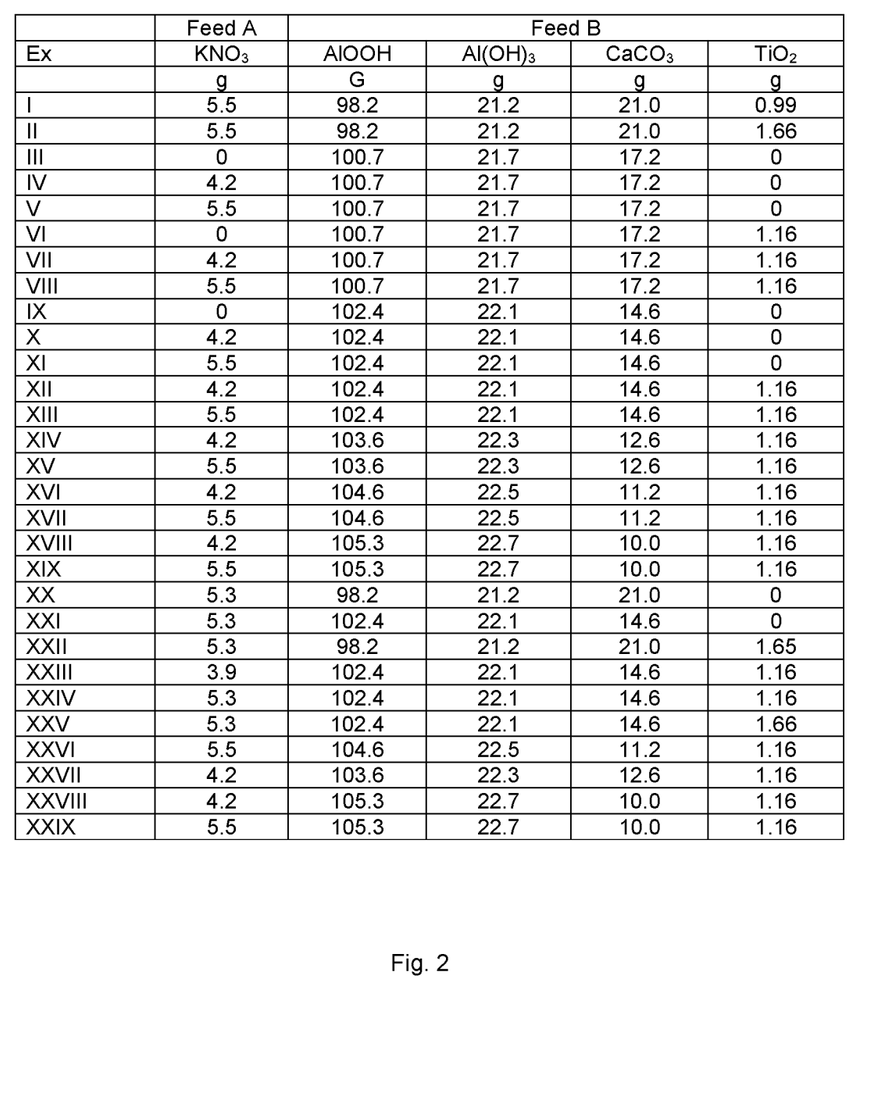
FIG. 2: Table presenting the amount of raw materials used for preparation of each of examples I-XXIX.

Support samples I-XIX were prepared according to this method with the amounts of $TiO_2$, $KNO_3$, AlOOH, $Al(OH)_3$, and $CaCO_3$ given in FIG. 2.

Examples III and IX are supports according to the prior art and does neither include potassium nor titanium added prior to calcining and sintering.

Examples IV, V, X and XI are supports according to the prior art and include potassium added prior to calcining and sintering (such as disclosed in WO 14/048740).

Example VI is a support according to the prior art and include titanium added prior to calcining and sintering (such as disclosed in WO 05/092497).

Examples I, II, VII, VIII, XII, XIII, XIV and XV are preferred supports according to the invention and include both potassium and titanium added prior to calcining and sintering and the molar Al:Ca ratio is in the range of from 7 to 14.

Examples XVI, XVII, XVIII and XIX are supports according to the invention and include both potassium and titanium added prior to calcining and sintering, however, the molar Al:Ca ratio is above 14 or 16, but below 20. The supports include minor amounts of $\alpha$-Al$_2$O$_3$.

Quantitative analysis of the crystalline phases present in each support material I to XIX were measured ex-situ by X-ray powder Diffraction (XRPD) technique using Cu K$\alpha$ radiation and Bragg-Brentano geometry (PANalytical Xpert Pro). The quantitative phase analysis was performed by Rietveld refinement using TOPAS (version 4.2) software. The quantitative analysis resulted in information of relative amounts of phases present, the average particle size and the lattice parameter. The analysis included all known K-$\beta$-alumina phases such as $KAl_{11}O_{17}$, $K_2Al_{11}O_{17.5}$, $K_{1.62}Mg_{0.62}Al_{0.62}Al_{10.38}O_{17}$, $K_2Mg_4Al_{30}O_{50}$ and the total sum of these phases are reported below as K-$\beta$-alumina.

Figure 1:
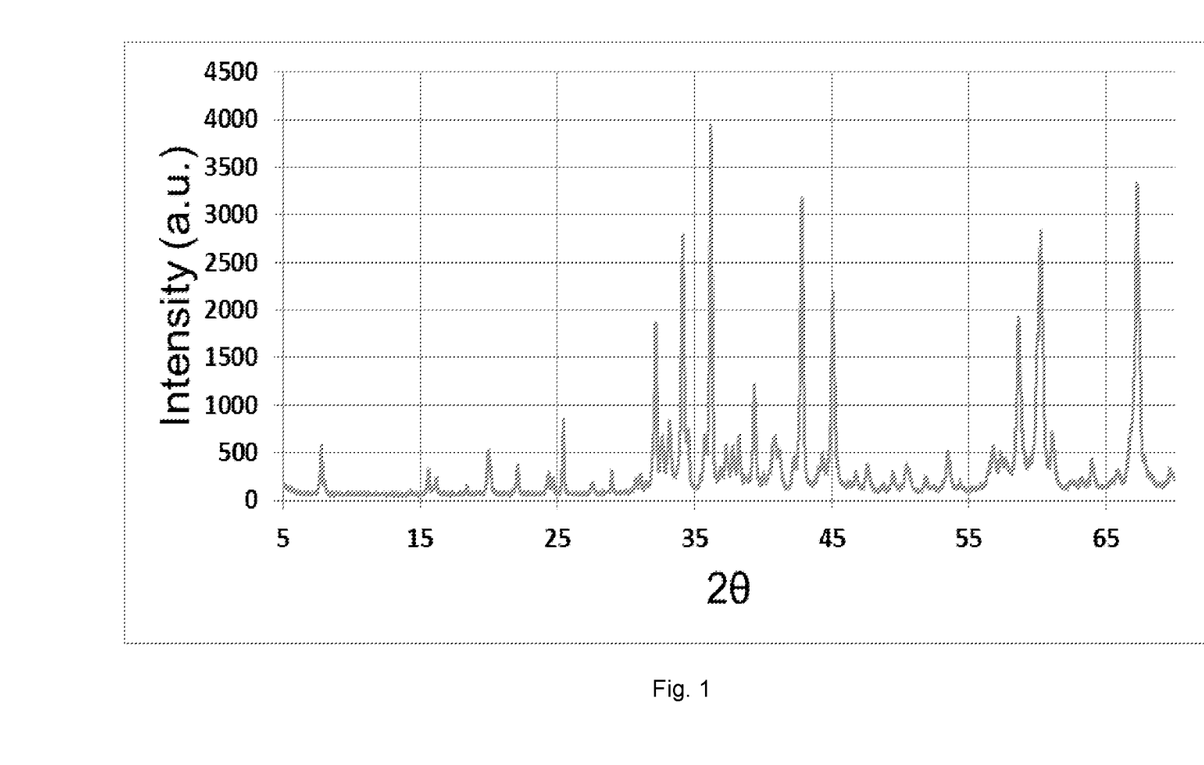
FIG. 1: XRPD diffractogram of support example XII containing 72.9 wt % hibonite ($CaAl_{12}O_{19}$), 10.6 wt % grossite ($CaAl_4O_7$), 0 wt % alpha-alumina and 16.9 wt % K-$\beta$-alumina.

An example of a diffractogram is depicted in FIG. 1 for support example XII. The quantitative analysis of the support example XII resulted in a phase composition of 72.9 wt % hibonite (CaAl$_{12}$O$_{19}$), 10.2 wt % grossite (CaAl$_4$O$_7$) and 16.9 wt % K-$\beta$-alumina.

The chemical elemental composition of each support material was determined by X-ray fluorescence (XRF). The prepared sample was irradiated by high energy X-rays from an X-ray source thereby producing secondary, fluorescent X-ray characteristics of the composition of the sample. The fluorescent X-rays were diffracted in an analyzing crystal and counted by a detector at the element specific diffraction angles. The intensities of the secondary X-rays reaching the detector was used for quantification of the element concentrations.

The BET surface area was determined by single point BET-analysis. The sample was placed in a U-tube and dried at 300° C. in a flow of helium for 8 hours. Hereafter the U-tube with the sample was cooled in a bath of liquid nitrogen and nitrogen was adsorbed on the sample by exposing the sample to a flow with 30% nitrogen in helium. When adsorption had come to an end the bath was removed and a desorption peak was recorded and integrated. The BET surface area was determined from the amount of nitrogen desorbed from the sample.

The pore volume was determined by Hg porosimetry. The sample was dried at 250° C. for 2 hours. The pore volume of the sample was determined by filling the pores with mercury. Pressure was ramped from ambient to 4140 bar and down again while pressure and volume data were collected. The data collected during pressurization were used for calculation of the pore size distribution (PV).

Figure 3:
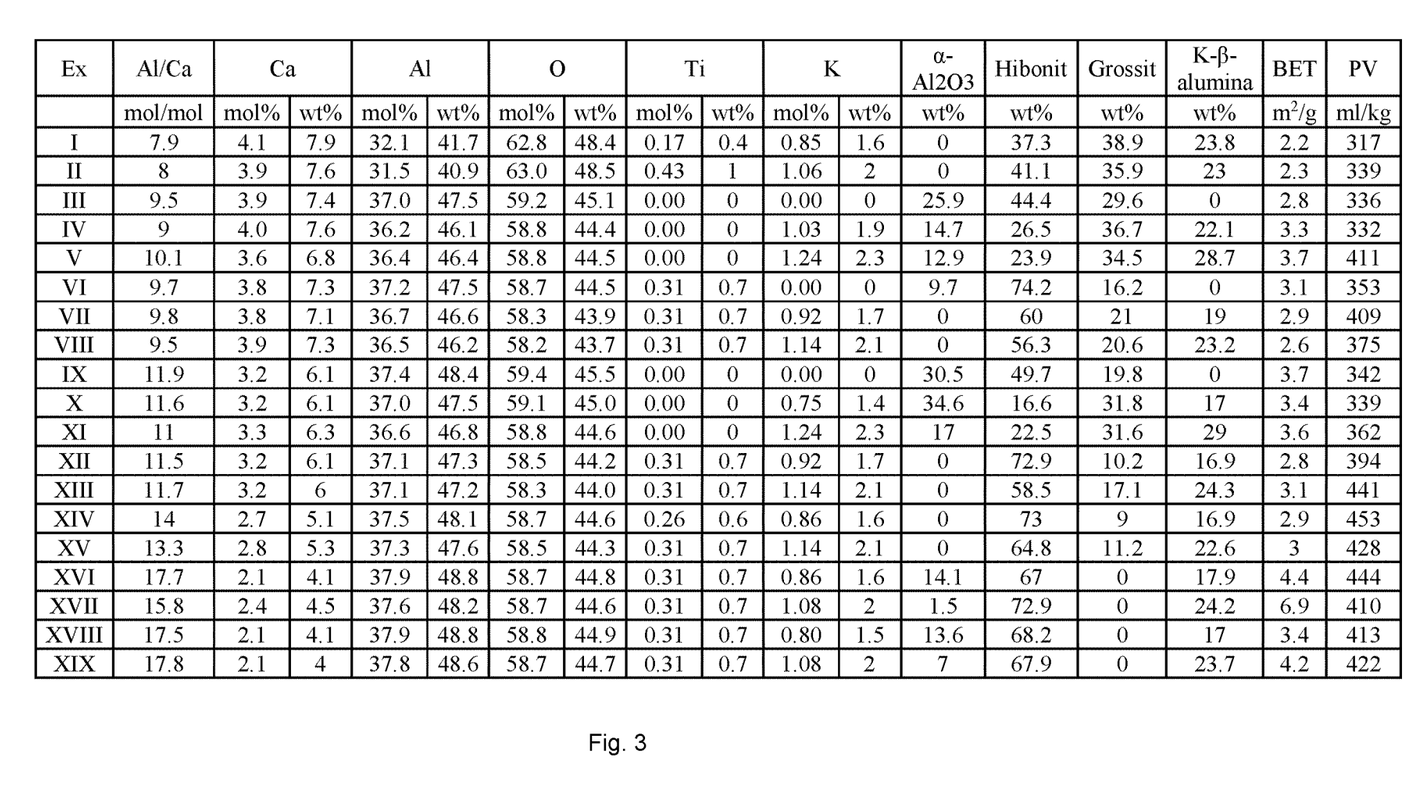
FIG. 3: Table presenting experimental data for the catalyst supports I-XIX of the examples. The table presents elemental chemical composition of the calcined and sintered catalyst supports in mol % and in wt % as measured by XRF, and phase composition in wt % as measured by XRPD. The supports containing Ti contain up to 1 wt % $CaTiO_3$. BET is BET surface area and PV is pore volume.

Accordingly, elemental chemical compositions of each support are given in FIG. 3—both in weight percent and in mol percent. FIG. 3 also shows the amounts of hibonite (CaAl$_{12}$O$_{19}$), grossite (CaAl$_4$O$_7$) and K-$\beta$-alumina in each support. All of the Ti promoted supports also contained up to 1 wt % CaTiO$_3$.

The results showed that adding potassium to the support without adding titanium, significantly reduced the concentration of hibonite. Without being bound by theory, this is an indication that the reaction between potassium and alumina is favored over the reaction between grossite and alumina and therefore the hibonite concentration decreases and the grossite concentration increases (see e.g. support examples IV and V vs III and X and XI vs IX).

The results also showed that adding titanium to the support without adding potassium increased the concentration of hibonite and decreased the concentration of grossite and $\alpha$-alumina, thus promoting the reaction between grossite and $\alpha$-alumina (see support example VI vs III).

When adding both Ti and K to the support prior to calcining and sintering, the inventors found that it is possible to obtain both a high concentration of K-$\beta$-alumina close to the K-$\beta$-alumina concentration for the Ti free sample and a high hibonite concentration. The inventors surprisingly found that such supports provided both the advantages connected to having K-$\beta$-alumina and having hibonite in the support as shown in the following examples. The inventors further found that when the molar ratio of Al to Ca was in the range of from 8 to 20, the maximum obtainable hibonite concentration was obtained. The inventors found that when Al/Ca was above 15 free $\alpha$-Al$_2$O$_3$ was observed, which adds undesirable acidity to the support. However, the test results show, that the presence of minor amounts of $\alpha$-Al$_2$O$_3$ did not significantly affect the performance of the supports and of the catalysts. The results also show that the Ti-promoted supports have higher pore volume than the unpromoted supports.

Examples XX-XXIX: Catalysts Used in Steam Reforming

The supports were prepared according to the method described above for examples I to XIX. See FIG. 2 for the materials used for preparing each of the supports for examples XX-XXIX.

Figure 4:
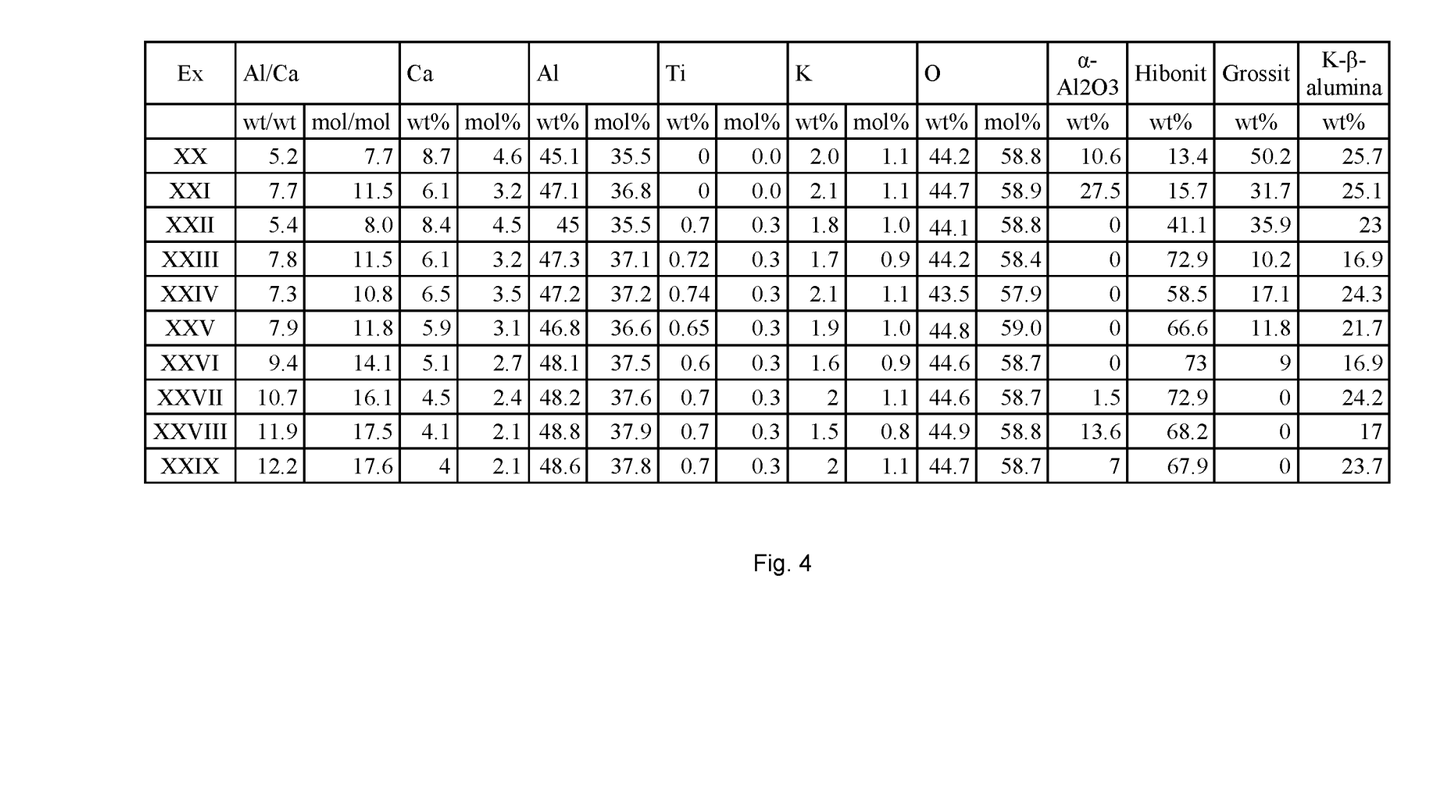
FIG. 4: Table presenting experimental data for the supports used to prepare the catalysts XX-XXIX of the examples. The table presents elemental chemical composition of the calcined and sintered supports in mol % and in wt % as measured by XRF, and phase composition in wt % as measured by XRPD. The supports containing Ti contain up to 1 wt % $CaTiO_3$.

The elemental chemical composition of the supports for examples XX-XXIX was determined as described above, and the results are found in FIG. 4. The phase composition was determined by XRPD as described above and these results are also found in FIG. 4.

Subsequently, the supports were impregnated by incipient wetness with a nickel nitrate solution and calcined at 450° C. The impregnation and calcination were repeated. The concentration of the nickel nitrate solution was adjusted to obtain a calcined catalyst comprising about 14 wt % nickel based on the calcined catalyst.

Figure 5:
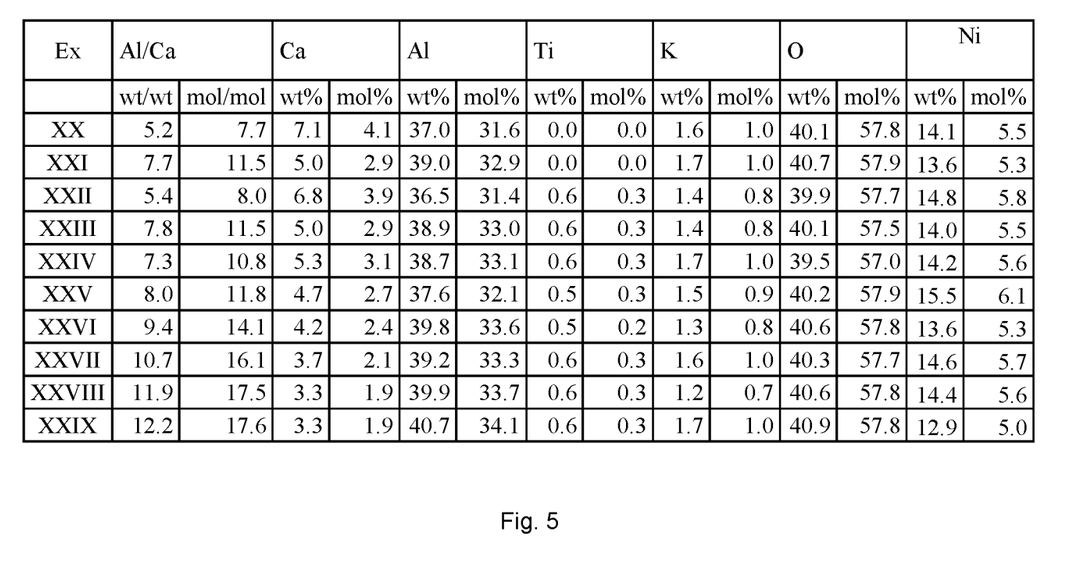
FIG. 5: Table presenting experimental data for the calcined catalysts XX-XXIX of the examples. The table presents elemental chemical composition of the fresh, calcined catalysts in mol % and in wt % as measured by XRF and phase composition in wt % as measured by XRPD.

The elemental chemical composition of the fresh, calcined catalysts of examples XX-XXIX was determined as described above, and the results are found in FIG. 5.

The properties of each of the catalysts XX-XXIX were tested according to the testing procedure described below. Each catalyst was tested on one sample before exposing the catalyst to an ageing procedure (fresh catalyst) and on another sample of the same catalyst after exposing it to an ageing procedure (aged catalyst) as described below.

Testing Procedure for the Catalysts XX-XXIX:

At least two samples of each catalyst XX-XXIX were placed in a tubular reactor and reduced in hydrogen at 525° C. to produce activated catalysts, of which one was subjected to an ageing procedure representing accelerated steam reforming conditions representing the life time of a steam reforming catalyst in operation. The elemental chemical composition and the phase composition of each sample (one before ageing and another after ageing) of the catalysts XX-XXIX were determined by XRF as described above. The relative potassium loss after ageing was also determined by the same method.

The ageing procedure representing accelerated steam reforming conditions were performed as follows:

The sample was aged in a stream of $H_2O/CO_2/H_2$ at temperatures ranging from 450 to 800° C. for 31 hours to produce an aged catalyst. After this the amount of potassium left on the catalyst was measured by chemical analysis using XRF as described above. The potassium loss is defined as the amount of potassium in the reduced passivated catalyst minus the amount of potassium left in the aged catalyst relative to the amount of potassium in the reduced, passivated catalyst.

Figure 6:
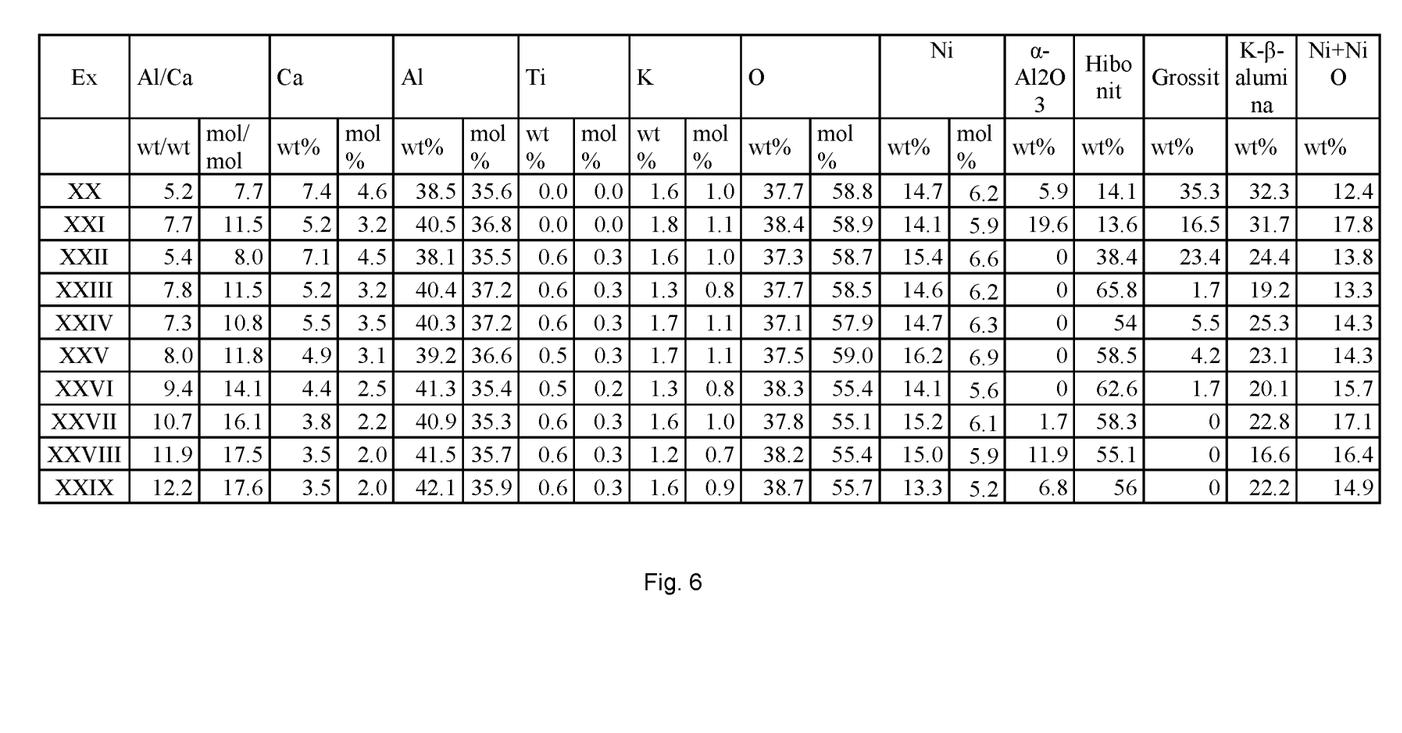
FIG. 6: Table presenting experimental data for the catalysts XX-XXIX of the examples. The table presents elemental chemical composition of the reduced, passivated catalysts in mol % and in wt % as measured by XRF and phase composition in wt % as measured by XRPD.

The elemental chemical composition and the phase composition of the reduced, passivated catalysts was determined as described previously and the results are found in FIG. 6.

The intrinsic steam reforming activity (kinetic studies) of fresh (reduced, passivated) and aged catalysts were performed as follows:

The intrinsic steam reforming activity was measured at 500° C. in a tubular reactor equipped with cylinders with high purity gases using a $CH_4/H_2O/H_2$ mixture with O/C=4. The activity loss is defined as the intrinsic activity of the reduced, passivated catalyst minus the intrinsic activity of the aged catalyst relative to the intrinsic activity of the reduced, passivated catalyst.

Determination of the relative potassium loss and critical O/C for carbon formation:

The carbon resistance of the catalyst aged at 800° C. was measured by thermogravimetric analysis at 500° C. using normal butane and water. At a constant water flow the butane flow was ramped and the O/C ratio at which carbon formation started characterized the critical O/C ratio of the catalyst.

The results of the intrinsic activity of the reduced, passivated catalysts and of the aged catalysts and the potassium loss of the aged catalyst are found in tables 1 and 2, respectively.

TABLE 1

Result of catalyst tests of reduced, passivated catalysts XX-XXIX

| | Chemical composition | | | Phase composition XRPD | | | | | |
|---|---|---|---|---|---|---|---|---|---|
| Example | Al/Ca mol/mol | Ti wt % | K wt % | $\alpha$-$Al_2O_3$ wt % | Gros wt % | Hib wt % | K-beta alumina wt % | Ni + NiO wt % | Act mol/g/h |
| XX | 7.7 | 0.0 | 1.6 | 5.9 | 35.3 | 14.1 | 32.3 | 12.4 | 0.48 |
| XXI | 11.5 | 0.0 | 1.8 | 19.6 | 16.5 | 13.6 | 31.7 | 17.8 | 0.36 |
| XXII | 8.0 | 0.6 | 1.6 | 0 | 23.4 | 38.4 | 24.4 | 13.8 | 0.20 |
| XXIII | 11.5 | 0.6 | 1.3 | 0 | 1.7 | 65.8 | 19.2 | 13.3 | 0.17 |
| XXIV | 10.8 | 0.6 | 1.7 | 0 | 5.5 | 54 | 25.3 | 14.3 | 0.25 |
| XXV | 11.8 | 0.5 | 1.7 | 0 | 4.2 | 58.5 | 23.1 | 14.3 | 0.22 |
| XXVI | 14.1 | 0.5 | 1.3 | 0 | 1.7 | 62.6 | 20.1 | 15.7 | 0.41 |
| XXVII | 16.1 | 0.5 | 1.6 | 1.7 | 0 | 58.3 | 22.8 | 17.1 | 0.42 |
| XXVIII | 17.5 | 0.5 | 1.2 | 11.9 | 0 | 55.1 | 16.6 | 16.4 | 0.46 |
| XXIX | 17.6 | 0.6 | 1.6 | 6.8 | 0 | 56 | 22.2 | 14.9 | 0.54 |

TABLE 2

Result of catalyst tests of aged catalysts XX-XXIX. The negative potassium losses are due to measurement uncertainty and illustrates a loss which is close to zero.

| | Aged | | | | | | | |
|---|---|---|---|---|---|---|---|---|
| | | Phase composition XRPD | | | | | | |
| Example | Al/Ca mol/mol | $\alpha$-$Al_2O_3$ wt % | Gros wt % | hib wt % | K-beta alumina wt % | Ni + NiO wt % | O/C | K-loss % | Act-loss % |
| XX | 7.7 | 7.1 | 37.7 | 12 | 27.7 | 15.5 | 1.9 | 16.9 | 95 |
| XXI | 11.5 | 19.9 | 26.5 | 14.2 | 25.7 | 13.7 | 1.7 | 14.8 | 82.2 |
| XXII | 8.0 | 0 | 28 | 36.8 | 20.9 | 14.3 | 1.1 | −3 | 56.6 |
| XXIII | 11.5 | 0 | 7.3 | 62.3 | 15.3 | 15.1 | 1.2 | 0.8 | 66.4 |
| XXIV | 10.8 | 0 | 12.5 | 50.8 | 19.2 | 15.9 | 1.1 | −7 | 71.2 |
| XXV | 11.8 | 0 | 8.7 | 56.9 | 19.6 | 14.9 | 1.5 | 2.4 | 61.7 |
| XXVI | 14.1 | 1.3 | 0.8 | 69.8 | 12.2 | 15.9 | 1.7 | −3.1 | 54.9 |
| XXVII | 16.1 | 2 | 0.1 | 62.5 | 17.4 | 18 | 1.8 | −3.1 | 53.3 |
| XXVIII | 17.5 | 13.7 | 0.1 | 58.7 | 11.6 | 15.7 | 2.2 | −2.2 | 53.4 |
| XXIX | 17.6 | 8.8 | 0 | 58.6 | 17.6 | 14.8 | 1.8 | −3.1 | 57.1 |

The catalyst tests demonstrated that the hibonite rich catalyst has lower potassium loss, lower activity loss that will lead to a higher EOR activity and higher carbon resistance demonstrated by the lower critical O/C ratio (Table 14). Promoting with Ti results in slightly lower concentration of the beta-alumina phase and significantly higher hibonite concentration. The higher concentration of hibonite has a positive effect on the long term catalyst activity and the carbon resistance which is improved even though the amount of potassium-beta-alumina phase is lower. Promoted catalysts also have a lower potassium loss demonstrating that a more stable potassium beta-alumina phase has been formed.

contained magnesium alumina spinel, the β-peak is dominating the reduction properties demonstrating that higher reduction temperatures are required for this catalyst compared to the catalysts of the present invention.

Temperature Programmed Reduction TPR

The TPR was carried out in a fixed bed reactor with an internal diameter of 3.8 mm. The catalyst was crushed to sieve fraction 150-300 μm and loaded in the reactor. A flow with 1% hydrogen in helium was passed through a bottle with water at 25° C. obtaining approximately 3 wt % of water in the feed. The catalyst bed was heated from room temperature to 1000° C. with a heating rate of 2° C./min. The composition of the exit gas was analyzed by a mass spectrometer (InProcess Instruments GAM 400).

TABLE 3

Results of TPR studies of selected catalysts. Example XXX is a catalyst according to EP 2900368. % β-peak is amount of consumed hydrogen in β-peak relative total amount of consumed hydrogen.

| | | Phase composition XRPD | | | | | | β-peak |
|---|---|---|---|---|---|---|---|---|
| Example | Al/Ca mol/mol | $\alpha$-$Al_2O_3$ wt % | Gros wt % | Hib wt % | Spinel wt % | K-beta wt % | Ni + NiO wt % | below 25% % |
| XXI | 11.5 | 19.6 | 16.5 | 13.6 | 0 | 31.7 | 17.8 | No |
| XXIII | 11.5 | 0 | 7.3 | 62.3 | 0 | 15.3 | 15.1 | Yes |
| XXVI | 14.1 | 0 | 1.7 | 62.6 | 0 | 20.1 | 15.7 | Yes |
| XXVIII | 17.5 | 11.9 | 0 | 55.1 | 0 | 16.6 | 16.4 | Yes |
| XXX | 21.3 | 0 | 13 | 0 | 66.6 | 8.3 | 12.1 | No |

When intrinsic activity increases the observed activity will also be increased. There is an efficiency factor—relation between intrinsic and observed.

Reduction properties of the catalysts according to the invention (XXIII, XXVI and XXVII) and some prior art catalysts (XXI and XXX)

The reduction properties of the catalysts were studied in temperature programmed reduction studies (TPR) in which catalyst samples were subjected to a gas with 1% hydrogen and 3% water in helium. The catalyst samples were heated from room temperature to 1000° C. and the hydrogen and water in the effluent stream as a function of temperature was measured by a mass spectrometry. The consumption of hydrogen reflects the ability of the catalyst sample to become reduced i.e. to become activated. The lower the temperature is at which the major part of the hydrogen is consumed at the better are the reduction properties of the catalyst sample. In the present study, two hydrogen consumption peaks were observed; a low temperature peak named α-peak with peak maximum in the range 450-520° C. and a high temperature peak named the β-peak with peak maximum in the range 740-760° C. The smaller the β-peak the better reduction properties of the catalyst as the reduction can be performed at a lower temperature and more easily. When the amount of consumed hydrogen represented by the β-peak compared to the total amount of consumed hydrogen is below 25% then sufficient NiO of the catalyst is reduced to ensure high activity of the catalyst in the top of the reactor.

In table 3 the results are given for the catalysts studied. A catalyst with high hibonite and K-β-alumina content in addition to low grossite content results in a catalyst with small amounts of the β-peak demonstrating the beneficial effect of the hibonite phase for the reduction properties. For a catalyst with composition as described in EP 2900368

The invention claimed is:

1. A catalyst support for use in steam reforming, the support comprising at least 35 wt % hibonite and 10-35 wt % potassium beta-alumina upon sintering, wherein the composition is essentially free of alumina spinel.

2. The catalyst support according to claim 1, wherein the total amount of hibonite and potassium beta-alumina is at least 60 wt % upon sintering.

3. The catalyst support according to claim 1, further comprising less than a total of 40 wt % of the alumina crystal structures grossite and/or alpha-alumina upon sintering.

4. The catalyst support according to claim 1, wherein the molar ratio of Al to Ca is in the range of from 8 to 20.

5. The catalyst support according to claim 1, comprising from 40-90 wt % hibonite, from 0-30 wt % grossite or alpha-alumina and from 10-30 wt % potassium beta-alumina.

6. The catalyst support according to claim 1, comprising oxides of aluminium, calcium, titanium and potassium, wherein the total weight of the oxides of aluminium, calcium, titanium and potassium account for minimum 99 wt % of the catalyst support on a dry matter basis.

7. A steam reforming catalyst comprising 75-90 wt % of the catalyst support according to claim 1, and 10-25 wt % nickel oxide on the basis of the calcined catalyst.

8. A steam reforming catalyst according to claim 7, comprising oxides of aluminium, calcium, titanium potassium and nickel, wherein the total weight of the oxides of aluminium, calcium, titanium potassium and nickel account for minimum 99 wt % of the calcined catalyst on a dry matter basis.

9. A process for producing a calcined steam reforming catalyst, comprising:
   a. providing a sintered catalyst support according to claim 1;
   b. applying an aqueous solution of a nickel salt to the sintered catalyst support to provide a catalyst precursor; and
   c. calcining the catalyst precursor at a catalyst calcining temperature in the range of from 350 to 550° C. to decompose the nickel salt into nickel oxide to obtain the calcined catalyst.

10. A process for producing a steam reforming catalyst, comprising, performing the method according to claim 9; and repeating steps b. and c. one or more times.

11. The process according to claim 9, wherein the nickel salt is selected from the group consisting of nickel nitrate, nickel acetate, nickel citrate, nickel lactate, and nickel carbonate; or combinations thereof.

12. A method comprising reacting steam with a hydrocarbon in the presence of the catalyst according to claim 7.

13. A steam reforming process comprising the steps of:
   providing a steam reforming catalyst according to claim 7;
   passing a hydrocarbon feed over said steam reforming catalyst in the presence of steam so as to produce synthesis gas.

14. A plant for producing hydrogen comprising a steam reforming reactor loaded with a catalyst according to claim 7.

15. A plant for producing synthesis gas comprising a steam reforming reactor loaded with a catalyst according to claim 7.

16. A catalyst support for use in steam reforming, the support comprising at least 35 wt % hibonite and 10-35 wt % potassium beta-alumina upon sintering, wherein the molar ratio of Ca:Al:Ti:K is in the range of 1:(8-20):(0.01-0.5):(0.05-1.0).

17. A catalyst support for use in steam reforming, the support comprising at least 35 wt % hibonite and 10-35 wt % potassium beta-alumina upon sintering, wherein the support comprises titanium in the range of from 0.1 to 2.7 mol %.

18. A catalyst support for use in steam reforming, the support comprising at least 60 wt % hibonite, 10-35 wt % potassium beta-alumina, and grossite, upon sintering.

19. The catalyst support according to claim 18, comprising 5-25 wt % grossite.

20. The catalyst support according to claim 18, comprising 5-15 wt % grossite.

21. The catalyst support according to claim 18, comprising 5-10 wt % grossite.

* * * * *